UNITED STATES PATENT OFFICE.

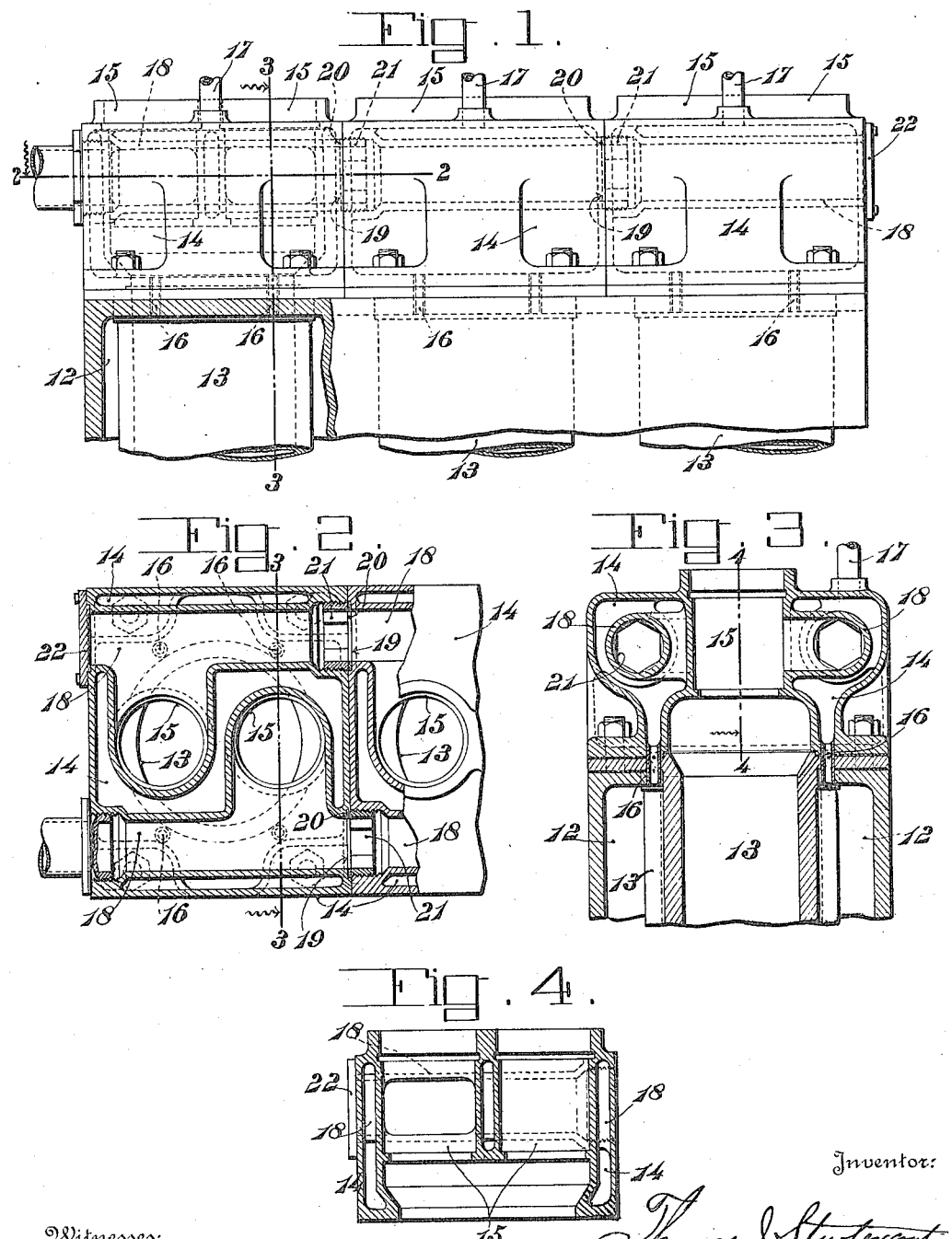

THOMAS JOSEPH STURTEVANT, OF WELLESLEY, MASSACHUSETTS, ASSIGNOR TO STURTEVANT MILL COMPANY, A CORPORATION OF MAINE.

INTERNAL-COMBUSTION ENGINE.

1,164,673.

Specification of Letters Patent. Patented Dec. 21, 1915.

Application filed August 13, 1914. Serial No. 856,598.

*To all whom it may concern:*

Be it known that I, THOMAS J. STURTEVANT, a citizen of the United States, residing at Wellesley, in the county of Norfolk and State of Massachusetts, have invented or discovered certain new and useful Improvements in Internal-Combustion Engines, of which the following is a specification, reference being had therein to the accompanying drawing.

This invention relates to internal combustion engines, and has for its object to simplify and lighten the engine by providing jacketed or water-cooled cylinder heads (in which the valves are mounted) of such construction as to afford inlet and exhaust passages within or integral with said heads, thereby affording compactness in the arrangement of the parts and enabling the conduits to be properly cooled. When the invention is embodied in multiple cylinder engines the conduits, formed integral with the heads will form sectional pipes.

In the accompanying drawing Figure 1 is a sectional elevation showing part of the engine embodying the present invention. Fig. 2 is a horizontal section on line 2—2, Fig. 1. Fig. 3 is a vertical section on line 3—3, Fig. 1 and Fig. 4 is a section through the cylinder head on line 4—4, Fig. 3.

Referring to the drawing, 12 denotes the upper portion of a water box of an internal combustion engine, and in which water box the cylinders 13 are mounted. These cylinders are preferably formed separate from the water box, so as to be removable therefrom, but may, if desired, be cast integral with the box, as is a well known construction. Suitably attached to the water box 12 are the jacketed or water-cooled cylinder heads 14, said cylinder heads being provided, as usual, with openings 15 for the inlet and exhaust valves. The chambers of these jacketed cylinder heads, through which water will be caused to circulate to cool the valves and other parts, preferably communicate with the chamber of the water box 12 by means of vertical pipes or passages 16, so that the water may flow from the chamber of the water box to the chambers of the jacketed heads, from which it will pass through the discharge pipes 17.

In accordance with the present invention the cylinder heads 14 are formed with pipes or passageways 18 preferably arranged on opposite sides of said heads and preferably cast integral with said heads; the said pipes or passageways communicating with the inlet and exhaust openings in the cylinder head or heads, and serving as sectional inlet and exhaust conduits. The inlet and exhaust valve openings 15 are arranged between the parallel inlet and exhaust pipes or passageways 18.

The cylinder heads 14 are bolted or otherwise suitably secured to the water box 12 in close contact with each other; and, to provide tight joints between the parts of the sectional conduits afforded by the passageways 18, the cylinder heads are preferably provided with annular recesses 19 at the ends of said pipes or passageways 18, and in which recesses packing gaskets 20 are received. Mounted in the cylinder heads, in register with the packing gaskets 20, are gasket nuts 21 having polygonal internal walls for the reception of a rod wrench having a polygonal head and by which said nuts may be screwed tightly against the said packing gaskets 20, to form tight joints. The conduits 18 are closed at one end by removable covers 22 which are screwed or otherwise suitably mounted in place after the gasket nuts have been screwed tightly against the gaskets.

From the foregoing it will be understood that the invention simplifies and renders compact the engine construction in that the fuel inlet and exhaust pipes or passageways are formed within the cylinder heads; and it will also be apparent that, by means of the packing gaskets and gasket nuts described, tight joints are afforded between the parts composing the sectional pipes or passageways in the several cylinder heads of a multiple cylinder engine.

It will be understood that the invention may be applied to an engine having any desired number of cylinders, and it will also be understood that the invention is not limited to the details of construction herein shown and described, as such details may be varied widely, within the limits of mechanical skill, without departing from the scope of the invention.

While the invention is more particularly intended for use in multiple cylinder engines, it may also be embodied in single cylinder engines, as will be obvious.

Having thus described my invention I claim and desire to secure by Letters Patent:

1. In a multiple-cylinder internal combustion engine, the combination with a water box and cylinders therein, of abutted water-jacketed cylinder-heads formed separate from and removably mounted on said box and provided with valve openings and with internal pipes or passageways communicating with said valve openings, and means for forming tight joints between the parts of the sectional conduits afforded by said internal pipes or passageways.

2. In a multiple-cylinder internal combustion engine, the combination with a water box and cylinders therein, of abutting water-jacketed cylinder-heads formed separate from and removably mounted on said box and provided with valve openings and with parallel internal pipes or passageways communicating with said valve openings, and means for forming tight joints between the parts of the sectional conduits afforded by said internal pipes or passageways, said means comprising recesses in said cylinder heads, packing gaskets in said recesses, and gasket nuts registering with said gaskets.

3. In a multiple-cylinder internal combustion engine, the combination with a water box and cylinders therein, of abutting cylinder heads removably mounted on said box and each containing an internal inlet passage for fuel and an exhaust passage, said passages being parallel to each other and arranged on opposite sides of said head, and means for forming gas-tight joints between the sections of the sectional conduits afforded by said passages, so as to afford tight continuous inlet and exhaust passages or pipes throughout the length of the engine within said heads.

4. In a multiple-cylinder internal combustion engine, the combination with a water box and cylinders therein, of jacketed cylinder heads each containing an internal inlet passage for fuel and an exhaust passage, said passages being arranged on opposite sides of said heads, and means for forming water- and gas-tight joints between the sections of the sectional conduits afforded by said passages, so as to afford tight continuous, inlet and exhaust passages or pipes throughout the length of the engine within said heads, said means comprising recesses in said cylinder heads, packing gaskets in said recesses, and gasket nuts registering with said gaskets.

5. In a multiple cylinder internal combustion engine, the combination with a water box and a plurality of cylinders therein, of abutting water jacketed cylinder heads removably attached to said water box and each having parallel gas conduits and inlet and exhaust passages formed integral therewith, said passages being between said conduits, a passageway leading from one of said conduits to the said inlet passage, a passageway from the said exhaust passage to the other of said conduits, means for connecting the said gas conduits of adjacent cylinders so as to form continuous gas tight parallel conduits through said cylinder heads, and a series of water conduits between said water box and said cylinder heads, whereby said heads and their parts may be cooled by jets of water forced from said box into said jacketed heads, said heads being each provided with a water exit or discharge passage.

6. In a multiple cylinder internal combustion engine, the combination with a water box carrying a plurality of cylinders and removable cylinder heads, the latter having parallel longitudinal gas conduits cast integral therewith, and inlet and exhaust valve openings between said conduits, said inlet opening being connected by a passageway with one of said conduits, and the said exhaust valve opening being connected with the other of said conduits, and each of said cylinder heads having recessed parts so that a gas tight connection may be made between the ends of the gas conduits of adjacent cylinder heads, so as to form continuous longitudinal passageways through a plurality of said heads, and said heads having water jackets directly communicating with the said water box to receive cooling water therefrom to cool the head parts.

7. In a multiple cylinder internal combustion engine, the combination of a water box containing a plurality of cylinders, a series of adjacent, recessed, removable, jacketed heads for said cylinders, each of said heads being connected by conduits with said box to receive cooling water therefrom, each jacketed head having a water discharge passage, each of said heads containing two parallel gas conduits cast integral therewith and arranged to aline with like passages in other heads, each head conduit having an inlet valve opening and an exhaust valve opening between its parallel gas conduits and having also a gas passageway leading from one of said conduits adapted to deliver gas in said inlet valve opening and another gas passageway adapted to lead gas from said exhaust valve to the other conduit, and means whereby a gas-tight connection may be made between the gas conduits of adjacent heads to form continuous passageways longitudinally of said engine.

In testimony whereof I affix my signature, in presence of two witnesses.

THOMAS JOSEPH STURTEVANT.

Witnesses:
 L. H. STURTEVANT,
 W. J. ELLIS.